United States Patent [19]

Sugie et al.

[11] 4,244,859

[45] Jan. 13, 1981

[54] AROMATIC POLYESTER COMPOSITION

[75] Inventors: Kiyoshi Sugie; Shizuka Kurisu; Shingo Emi; Shizuo Azuma; Toshiaki Harada; Shoji Kawase, all of Iwakuni, Japan

[73] Assignee: Teijin Limited, Osaka, Japan

[21] Appl. No.: 959,636

[22] Filed: Nov. 13, 1978

[30] Foreign Application Priority Data

| Nov. 15, 1977 | [JP] | Japan | 52-136231 |
| Dec. 14, 1977 | [JP] | Japan | 52-149375 |
| Jan. 17, 1978 | [JP] | Japan | 53-2658 |

[51] Int. Cl.$^3$ .................... C08K 3/34; C08K 7/00
[52] U.S. Cl. .................... 260/40 R; 525/64; 525/444
[58] Field of Search .................... 260/40 R, 873, 860

[56] References Cited

U.S. PATENT DOCUMENTS

| 3,764,456 | 10/1973 | Woodhams | 161/171 |
| 3,859,246 | 1/1975 | Jackson et al. | 260/40 R |
| 3,931,094 | 1/1976 | Segal et al. | 260/40 R X |
| 3,953,394 | 4/1976 | Fox et al. | 260/873 X |
| 4,011,285 | 3/1977 | Seymour et al. | 260/40 R X |
| 4,022,748 | 5/1977 | Schlichting et al. | 260/40 R |
| 4,064,098 | 12/1977 | Saitoh et al. | 260/40 R |
| 4,096,202 | 6/1978 | Farnham et al. | 260/873 |
| 4,097,446 | 6/1978 | Abolins et al. | 260/860 X |
| 4,111,893 | 9/1978 | Gasman et al. | 260/40 R |

Primary Examiner—Sandra M. Person
Attorney, Agent, or Firm—Sherman & Shalloway

[57] ABSTRACT

A novel composition comprising 100 parts by weight of an aromatic polyester, 5 to 150 parts by weight of powdery feldspar and optionally 5 to 120 parts by weight of a plate-like inorganic filler such as glass flakes and/or 1 to 100 parts by weight of a rubbery elastomer such as acrylic rubber. Up to a half of the powdery feldspar may be replaced by another pulverulent inorganic filler such as talc. The composition is useful as engineering plastics because it gives molded articles having high impact strength and heat distortion temperatures and reduced warping.

6 Claims, No Drawings

AROMATIC POLYESTER COMPOSITION

This invention relates to an aromatic polyester composition, and more specifically, to an aromatic polyester composition capable of giving molded articles having high tensile strength, impact strength and heat distortion temperatures and reduced anisotropic shrinkage.

Aromatic polyesters, especially polybutadiene terephthalate (PBT for short), have superior processability, chemical characteristics and mechanical characteristics. For example, they can be crystallized without heat treatment or without using a mold kept at high temperatures, and have low water absorption. In spite of the superior properties of PBT, molded articles from PBT have a low heat distortion temperature, and this limited its use in a wider range of applications.

It has been known to add inorganic fillers such as glass fibers, powdery quartz, mica or talc to aromatic polyesters in order to improve the physical, thermal and chemical properties (such as tensile strength, flexural strength, rigidity, heat distortion temperature and dimensional stability) of molded articles prepared therefrom. When glass fibers are used, anisotropy incident to the direction of flow of the resin during molding occurs in the molded products, and causes them to warp. Anisotropy is small when mica and talc are used, but impact strength is markedly reduced. The use of powdery quartz keeps good impact strength and reduces anisotropy. However, because of the hardness of quartz, it poses a serious problem of causing wear to screws or cylinders in compounding it with the polyester in extruders.

The present inventors made extensive investigations in order to solve these problems, and found that the addition of powdery feldspar to an aromatic polyester, especially PBT, gives a composition which can give molded articles having superior impact strength and tensile strength, and a high heat distortion temperature and being free from warping.

Thus, according to this invention, there is provided a composition comprising 100 parts by weight of an aromatic polyester and 5 to 150 parts by weight of powdery feldspar.

PBT is preferred as the aromatic polyester used in this invention. Other useful aromatic polyesters include polyalkylene terephthalates such as polyethylene terephthalate, and polyalkylene naphthalates such as polyethylene naphthalate and polybutylene naphthalate. As is generally known, PBT is obtained by an esterification reaction or ester-interchange reaction between terephthalic acid or its ester-forming derivative as an acid component and 1,4-butanediol or its ester-forming derivative as a glycol component. PBT includes copolymers consisting of an acid component containing at least 80 mole% of terephthalic acid and a glycol component containing at least 80 mole% of 1,4-butanediol. Examples of a comonomeric ingredient of the acid component are isophthalic acid, p-hydroxybenzoic acid, adipic acid, sebacic acid, 1,10-decanedicarboxyic acid and various naphthalenedicarboxylic acids. Of these 1,10-decanedicarboxylic acid is preferred. Examples of a comonomeric ingredient of the glycol component include ethylene glycol, propylene glycol, hexamethylene glycol, 1,4-cyclohexanediol and neopentyl glycol. PBT may also contain a branching agent and/or an end blocking agent.

Preferably, the aromatic polyester used in this invention has an intrinsic viscosity $[\eta]$ of at least 0.58, especially at least 0.65, above all at least 0.71. The reduced viscosity in this invention is measured in orthochlorophenol at 35° C. at a polymer concentration of 1.2 g/100 ml.

The powdery feldspar used in this invention is a pulverized product of a feldspar such as orthoclase and plagioclase, preferably a pulverized product of nepheline syenite. The amount of the powdery feldspar in the resin composition is 5 to 150 parts by weight, preferably 10 to 120 parts by weight, more preferably 20 to 100 parts by weight, per 100 parts by weight of the aromatic polyester. Its particle diameter is not particularly restricted, but is preferably 1 to 50 microns. Feldspar powder having an average particle diameter of not more than 30 microns is especially preferred.

The present inventors also found that when a plate-like inorganic filler is included in the composition of this invention as an additional ingredient, the rigidity, flexural modulus and heat distortion temperature of molded articles prepared from the resulting composition can be improved, and when a certain rubbery elastomer is incorporated, the impact strength of molded articles prepared from the resulting composition can be increased. Accordingly, as one modification, the present invention provides a composition comprising 100 parts by weight of an aromatic polyester, 5 to 150 parts by weight of powdery feldspar and 5 to 120 parts by weight of a plate-like inorganic filler and/or 1 to 100 parts by weight of a rubbery elastomer.

The plate-like inorganic filler includes, for example, glass flakes and mica. The glass flakes, after having been incorporated in the aromatic polyester resin, have a long diameter of not more than 1000 microns, preferably 1 to 500 microns, and an aspect ratio (the ratio of the long diameter to thickness) of at least 5, preferably at least 10, especially preferably at least 30. Glass flakes which are marketed can be used in this invention. Sometimes, the glass flakes undergo some pulverization when being mixed with the resin.

When the long diameter of the glass flakes exceeds 1,000 microns, it is difficult to mix them uniformly with the resin, and the properties of molded articles prepared from the resulting composition become non-uniform. Glass flakes having an aspect ratio of less than 5 do not produce an effect of increasing the heat distortion temperature of the molded articles.

The amount of the glass flakes is 5 to 120 parts by weight per 100 parts by weight of the aromatic polyester. If the amount is less than 5 parts by weight, the intended effect is not fully exhibited, and when the amount exceeds 120 parts by weight, the glass flakes are difficult to mix uniformly with the resin, and the resulting resin has reduced moldability.

Examples of the rubbery elastomers that may be used in this invention are elastomers obtained by copolymerizing a vinyl monomer with a base polymer selected from homo- or copolymers containing at least 70% of a unit derived from an acrylic ester in which the alkyl group contains 1 to 13 carbon atoms. These elastomers contain 30 to 90% of the acrylic ester unit. The copolymerization can be performed by graft copolymerization, random copolymerization or block copolymerization. Graft copolymerization is preferred from the viewpoint of improving impact characteristics.

Examples of the homopolymers of acrylic esters in which the alkyl group contains 1 to 13 carbon atoms are polyethyl acrylate, polybutyl acrylate, and polyoctyl acrylate. Copolymers of the acrylic esters include copolymers of acrylic esters and vinyl monomers such as methyl methacrylate, allyl methacrylate and styrene. Those containing at least 70% of the acrylic ester unit are preferred to improve impact characteristics.

Vinyl monomers to be copolymerized with the base polymers are, for example, methacrylic esters, aromatic vinyl monomers and vinyl cyanides. These vinyl monomers can be used either singly or as a mixture of two or more. Examples of the methacrylic esters include methyl methacrylate, ethyl methacrylate, propyl methacrylate, allyl methacrylate, isopropyl methacrylate, and butyl methacrylate. Methyl methacrylate is preferred. Examples of the aromatic vinyl monomers are styrene, $\alpha$-methylstyrene, vinyltoluene, vinylxylene, trimethylstyrene, and halogenated styrenes. Styrene is preferred. Vinyl cyanide monomers are, for example, acrylonitrile and methacrylonitrile. Acrylonitrile is preferred.

The acrylic acid ester elastomer used in this invention when prepared by graft copolymerization contains 30 to 90% by weight, preferably 40 to 80% by weight, of the base polymer. When the content of the base polymer is less than 30% by weight, the improvement of impact characteristics is not sufficient. When it exceeds 90% by weight, uniform mixing of it with the aromatic polyester is difficult, and the resulting composition has poor moldability.

A poly(ether.ester) elastomer can also be used in this invention. The poly(ether.ester) elastomer denotes a polyester elastomer which is derived from (1) a dicarboxylic acid and/or its ester-forming derivative, (2) a low-molecular-weight glycol and/or its ester-forming derivative and (3) a polyoxyalkylene glycol having an average molecular weight of 500 to 5,000 and/or its ester-forming derivative, and in which the polyester derived from ingredients (1) and (2) has a melting point of at least 140° C., and the weight of the unit derived from ingredient (3) is 5 to 95% by weight based on the entire polymer.

Typically, the ingredient (1) is an aromatic dicarboxylic acid. Examples of preferred aromatic dicarboxylic acids are terephthalic acid, isophthalic acid, naphthalenedicarboxylic acids, diphenylcarboxylic acid, diphenylsulfonedicarboxylic acid, diphenoxyethanedicarboxylic acid, diphenyl ether dicarboxylic acid, 3-methylterephthalic acid and 4-methylisophthalic acid. Terephthalic acid is especially preferred. A part, preferably up to 30 mole%, more preferably up to 20 mole%, of the ingredient (1) may be replaced by another dicarboxylic acid. Examples of the other dicarboxylic acid are aliphatic dicarboxylic acids such as succinic acid, adipic acid, sebacic acid, dodecanedicarboxylic acid or dimeric acid; alicyclic dicarboxylic acids such as cyclohexane dicarboxylic acid; and hydroxycarboxylic acids such as $\epsilon$-hydroxycaproic acid, hydroxybenzoic acid and hydroxyethoxybenzoic acid. The ester-forming derivatives of the dicarboxylic acids can also be used as the ingredient (1). Examples are the lower alkyl esters, aryl esters, and acid halides of the dicarboxylic acids.

Examples of the low-molecular-weight diol as ingredient (2) include ethylene glycol, trimethylene glycol, tetramethylene glycol, neopentylene glycol, hexamethylene glycol, decamethylene glycol, cyclohexane dimethylol, 2,2-bis($\beta$-hydroxyethoxyphenyl)propane, hydroquinone, and 2,2-bis(hydroxyphenyl)propane. Tetramethylene glycol is preferred. The ester-forming derivatives of the low-molecular-weight glycols can also be used as the ingredient (2). Examples are lower fatty acid esters of glycols and ethylene oxides of glycols.

Examples of preferred polyoxyalkylene glycols as ingredient (3) are poly(ethylene glycol), poly(propylene glycol), poly(tetramethylene glycol), and copolymers of two or more of these. Poly(tetramethylene glycol) is preferred. The ester-forming derivatives of the polyoxyalkylene glycols can also be used as the ingredient (3). Examples are lower fatty acid esters of the polyoxyalkylene glycols. The polyoxyalkylene glycol as ingredient (3) has an average molecular weight of 500 to 5,000, preferably 600 to 4,000, more preferably 800 to 3,000. The proportion of the polyoxyalkylene glycol is 5 to 95% by weight, preferably 5 to 85% by weight, more preferably 10 to 80% by weight, especially preferably 15 to 75% by weight, based on the total weight of the polymer.

The amount of the rubbery elastomer is usually 1 to 100 parts by weight, preferably 3 to 70 parts by weight, especially preferably 5 to 50 parts by weight, per 100 parts by weight of the aromatic polyester. When the amount of the rubbery elastomer is less than 1 part by weight, the degree of improvement of impact characteristics is not sufficient. When it exceeds 100 parts by weight, the thermal properties are degraded.

Up to a half of the powdery feldspar, i.e. 2.5 to 75 parts by weight per 100 parts by weight of the aromatic polyester, can be replaced by a pulverulent inorganic filler other than the feldspar. The pulverulent inorganic filler broadly includes fillers which are usually added to extend resins or rubbers, adjust their viscosities or modify their properties. Examples include talc, quartz, diatomaceous earth, calcium carbonate, barium sulfate, titanium oxide, bentonite, carbon black, kaolin clay, and acid terra alba. The particle diameters of these inorganic fillers may be those of commercially available products, and no particular restriction is imposed. Preferably, the particle diameters of these fillers are 1 to 50 microns, and fillers having an average particle diameter of not more than 30 microns are especially preferred. The pulverulent inorganic filler serves to increase the rigidity of molded articles as does the powdery feldspar, but tends to reduce impact strength. Accordingly, it should not be added in an amount exceeding a half of the powdery feldspar.

In preparing the composition of this invention, the individual ingredients are mixed by any desired means. For example, the aromatic polyester in the molten state is mixed with other ingredients, or a method can be employed which comprises mixing all the required ingredients in advance, melting the mixture, and further effecting the mixing of the mixture. At this time, the glass flakes or irregularly-shaped inorganic solids may be treated with a coupling agent such as rosin, a silane coupling agent or a titanium coupling agent, or with an epoxy compound prior to use.

The composition of this invention may further include pigments, stabilizers, plasticizers, lubricants, fluorescent bleaching agents, reinforcing agents, nucleating agents, etc. Fire retarding additives may also be included.

The fire retarding additives consist of a fire retardent and a fire retarding aid. Compounds containing halogen, phosphorus, nitrogen, etc. are used as the fire retardant. Specifically, they include, for example, organic halogen compounds and phosphorus compounds. Numerous compounds have been known heretofore which are useful as fire retardants and fire retarding aids. In the present invention, these compounds can be used. Suitable fire retarding additives are a combination of organic or inorganic antimony compounds (for example, antimony trioxide) with halogenated organic compounds (especially, brominated or chlorinated organic compounds), especially a combination of antimony trioxide with a carbonate of a halogenated bisphenol or its oligomer. Preferred carbonates of halogenated bisphenols or oligomers thereof are carbonates or oligomers thereof expressed by the following formula

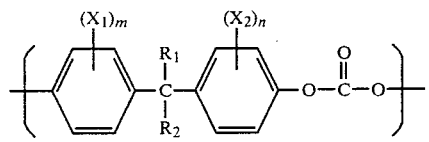

wherein $R_1$ and $R_2$ each represent a hydrogen atom, an alkyl group containing 1 to 4 carbon atoms or a phenyl group, $X_1$ and $X_2$ represent a bromine or chlorine atom, and m and n are numbers of 1 to 4 (with an average degree of polymerization of 2 to 30, preferably 2 to 25). In the above formula, the terminal groups may be any organic groups such as phenyl, substituted phenyl, or alkyl.

Since the feldspar, plate-like inorganic filler and pulverulent inorganic filler are non-combustible, a sufficient fire retarding effect can be obtained by incorporating the fire retardant in an amount of 10 to 50 parts by weight, preferably 15 to 30 parts by weight, per 100 parts by weight of the polyester composition.

The composition of this invention is useful as engineering plastics because it gives molded articles having superior tensile strength and impact strength, a high heat distortion temperature and reduced anisotropic shrinkage. It finds particularly suitable applications in fields which require high impact strength and low warping, for example as electric component parts and automobile parts.

The following Examples taken in conjunction with Controls illustrate the present invention. The intrinsic viscosities $[\eta]$ in these examples were measured in orthochlorophenol at 35° C. at a polymer concentration of 1.2 g/100 cc. All parts in these examples are by weight.

EXAMPLE 1

Seventy parts of PBT having an $[\eta]$ of 1.1 and 30 parts of powdery feldspar (Minex-7, a trademark for a product of Indusmin Company, average particle diameter 4.5 microns) were kneaded by an extruder having a screw diameter of 50 mm at a cylinder temperature of 260° C. to form chips. The chips were molded by an injection molding machine at a mold temperature of 60° C. The impact strengths (ASTM D-256, thickness ¼ inch, notched; unless otherwise indicated, the same samples were used in other examples), and heat distortion temperature (ASTM D-648, thickness ¼ inch, load 264 psi; the same samples were used in other examples) of the molded article were measured.

Flat plates were prepared by using a 3.5-ounce in-line screw type injection molding machine made by Nikko Anker with a mold dimension of 9.90 cm in length, 10.35 cm in width and 0.20 cm in thickness. The percent molding shrinkages of the flat plates were measured. When the percent molding shrinkages of a molded article in the longitudinal and transverse directions are closer to each other (that is, when the ratio of the percent shrinkages more approaches 1.0), the warping of the molded article is small, and stress is small in molded articles of various configurations.

The results are shown in Table 1.

CONTROL 1

The same procedure as in Example 1 was repeated except that talc (PKS, a trademark for a product of Hayashi Chemical Co., Ltd.) was used instead of the powdery feldspar. The results are shown in Table 1.

CONTROL 2

The same procedure as in Example 1 was repeated except that wollastonite was used instead of the powdery feldspar. The results are shown in Table 1.

CONTROL 3

The same procedure as in Example 1 was repeated except that mica was used instead of the powdery feldspar. The results are shown in Table 1.

CONTROL 4

One hundred parts of PBT having an $[\eta]$ of 1.1 was kneaded in an extruder having a screw diameter of 50 mm at a cylinder temperature of 260° C. to form chips. The chips were molded in the same way as in Example 1, and tested. The results are shown in Table 1.

TABLE 1

| | Impact strength (kg · cm/cm) | Heat distortion temperature (°C.) | Ratio of percent molding shrinkages |
|---|---|---|---|
| Example 1 | 4.6 | 115.0 | 1.19 |
| Control 1 | 3.0 | 155.7 | 1.40 |
| Control 2 | 2.8 | 165.0 | 1.70 |
| Control 3 | 2.4 | 188.0 | 1.50 |
| Control 4 | 5.2 | 55.0 | 1.20 |

EXAMPLE 2

The procedure of Example 1 was repeated except that 60 parts of PBT having an $[\eta]$ of 1.1 and 40 parts of powdery feldspar were used. The resulting molded article had an impact strength of 4.0 kg·cm/cm, a heat distortion temperature of 119.0° C. and a ratio of percent molding shrinkages of 1.20.

EXAMPLE 3

The procedure of Example 1 was repeated except that 68.5 parts of PBT having an $[\eta]$ of 1.1, 30 parts of powdery feldspar and 1.5 parts of rosin as a surface reinforcing agent. The resulting molded article had an impact strength of 6.3 kg·cm/cm, a heat distortion temperature of 90° C. and a ratio of percent molding shrinkages of 1.20.

EXAMPLE 4 and CONTROL 5

To 100 parts by weight of polybutylene terephthalate having an intrinsic viscosity $[\eta]$ of 0.91 were added the fillers shown in Table 2 in the amounts indicated. The mixture was melt-kneaded by an extruder having a screw diameter of 65 mm at a cylinder temperature of 240° C. The resulting polyester composition was formed into chips. The chips were injection molded by a 1-ounce injection molding machine under the following conditions.

Cylinder temperature: 240° C.

Molding cycle: primary pressure (hydrualic pressure 80 kg/cm²) 2 seconds; secondary pressure (hydraulic pressure 50 kg/cm²) 8 seconds; and cooling time 25 seconds.

Mold temperature: 60° C.

The impact strength, tap strength, and heat distortion temperature of the molded articles were measured. The tap strength was measured by a simplified procedure which comprises forming a hole, 4 mm in diameter, in a ¼ inch test piece by a drilling machine, inserting a wooden screw having an outside diameter of 4.5 mm and a length of 5 cm, and measuring the depth (cm) to which the screw has been inserted at breakage of the molded article. The larger this value, the higher is the tap strength of the molded article.

The results are shown in Table 2.

TABLE 2

| Example (Ex.) or Control (C.) | Filler | | Properties of molded articles | | | | |
|---|---|---|---|---|---|---|---|
| | Type | Amount (parts) | Impact strength (kg · cm/cm) | Percent molding shrinkage (%) | | Ratio of percent molding shrinkages | Heat distortion temperature (°C.) |
| | | | | Longitudinal | Transverse | | |
| Ex. 4 | Glass flakes (aspect ratio, 30) | 17 | 4.9 | 0.92 | 1.16 | 1.27 | 142 |
| | Talc | 10 | | | | | |
| | Feldspar | 13 | | | | | |
| C. 5 | Glass fibers | 40 | 9.1 | 0.20 | 1.22 | 6.10 | 214 |

It is seen from the results given in Table 2 that the polyester composition of this invention gives a molded article having reduced warpage, superior impact strength, tap strength and a high heat distortion temperature.

EXAMPLE 5

To 100 parts of PBT having an intrinsic viscosity [η] of 0.91 were added 13 parts of glass flakes (aspect ratio 30), 10 parts of talc and 17 parts of powdery feldspar. The mixture was processed in the same way as in Example 4. The properties of the resulting molded article were measured, and the results are as follows:

Impact strength (kg·cm/cm): 5.5
Percent molding shrinkage (%):
  Longitudinal direction 0.90
  Transverse direction 1.11
Ratio of the shrinkages: 1.23
Heat distortion temperature (°C.): 138

EXAMPLE 6

To 100 parts of PBT having an intrinsic viscosity [η] of 0.89 were added 10 parts of polyhexamethylene terephthalate having an [η] of 0.95 and 40 parts of powdery feldspar, and the mixture was melt-kneaded by an extruder having a screw diameter of 50 mm at a cylinder temperature of 240° C. The resulting polyester composition was formed into chips, and molded by a 1-ounce injection molding machine under the following conditions.

Cylinder temperature: 240° C.
Molding cycle: primary pressure (hydraulic pressure, 80 kg/cm²) 2 seconds, secondary pressure (hydraulic pressure 50 kg/cm²) 8 seconds; cooling time 20 seconds.
Mold temperature: 60° C.

The impact strength of the molded article was measured.

The results are as follows:

Impact strength: 8.2 kg·cm/cm
Heat distortion temperature: 105.0° C.
Ratio of percent molding shrinkages: 1.25

EXAMPLE 7

Rosin (0.3 part) was dissolved in acetone to form an acetone solution having a concentration of 200 g/liter. The solution was sprayed onto 30 parts of powdery feldspar which was being sufficiently stirred. The treated powdery feldspar was dried, and then melt-mixed with 70 parts of polybutylene terephthalate having an intrinsic viscosity [η] of 1.1 by an extruder having a screw diameter of 50 mm at a cylinder temperature of 240° C. to form chips. The chips were molded by an injection molding machine. The resulting molded article had an impact strength of 5.6 kg·cm/cm, and a good surface luster.

EXAMPLE 8

Sixty-two (62) parts of a copolyester having an [η] of 1.1 obtained by copolymerizing 95 mole% of dimethyl terephthalate, 5 mole% of 1,10-decanedicarboxylic acid and 140 mole% of 1,4-butanediol in the presence of titanium tetrabutoxide [Ti(OC₄H₉)₄] as a catalyst was mixed with 10 parts of powdery feldspar (Minex-7, a trademark for a product of Indusmin Company; average particle diameter of 4.5 microns), 8 parts of talc and 12 parts of India mica in an extruder having a screw diameter of 50 mm at a cylinderη temperature of 240° C. to form chips. The chips were molded by an injection molding machine at a mold temperature of 60° C. The properties of the resulting molded article are shown in Table 3.

CONTROL 6

A polyester having an [η] of 1.1 obtained by copolymerizing 95 mole% of dimethyl terephthalate, 5 mole% of 1,10-decanedicarboxylic acid and 140 mole% of 1,4-butanediol was molded and tested in the same way as in Example 8. The properties of the molded article are shown in Table 3.

TABLE 3

| | Impact strength (kg · cm/cm) | Heat distortion temperature (°C.) | Ratio of percent molding shrinkages |
|---|---|---|---|
| Example 8 | 4.0 | 140 | 1.23 |
| Control 6 | 5.9 | 50 | 1.15 |

REFERENTIAL EXAMPLE (the production of a rubbery elastomer)

(a) A polymerization vessel was charged with 1 part of disproportionated potassium rhodinate, 200 parts of water, 0.19 part of formaldehyde sodium sulfoxylate dihydrate, 0.005 part of ferrous sulfate and 0.01 part of disodium ethylenediaminetetraacetate, and they were heated to 60° C. in a stream of nitrogen. With stirring, a mixture consisting of 100 parts of butyl acrylate, 0.5 part of allyl methacrylate and 0.2 part of cumene hydroperoxide was added dropwise over the period of 5 hours. The mixture was further heated to 80° C., and reacted at this temperature for 3 hours to form a latex of polybutyl acrylate.

(b) A polymerization vessel was charged with 60 parts (as solids) of the resulting polubutyl acrylate, 1 part of disproportionated potassium rhodinate, 200 parts of water (including the water in the latex), 0.19 part of formaldehyde sodium sulfoxylate dihydrate, 0.005 part of ferrous sulfate and 0.01 part of disodium ethylenediaminetetraacetate, and they were heated to 70° C. in a stream of nitrogen. With stirring, a mixture consisting of 24 parts of methyl methacrylate, 8 parts of styrene, 8 parts of acrylonitrile, 0.25 part of triallyl isocyanurate and 0.2 part of cumene hydroperoxide was added dropwise over the period of 2 hours. The mixture was further heated to 80° C., and polymerized at this temperature for 3 hours. The resulting copolymer was washed with water and dried in a customary manner to recover it in the form of a powder.

EXAMPLES 9 to 11

To 100 parts of polybutylene terephthalate having an intrinsic viscosity $[\eta]$ of 1.08 were added the glass flakes, inorganic solids and rubbery elastomers shown in Table 4 in the amounts indicated. The mixture was melted, kneaded and extruded by an extruder having a screw diameter of 65 mm at a cylinder temperature of 250° C. to form pellets.

Specimens for impact strength testing were prepared from the resulting pellets, and tested. The results are shown in Table 4.

It is seen from the results given in Table 4 that the molded articles from the polyester compositions of the invention have very high impact strengths.

Discs having a thickness of ¼ inch and a diameter of 4 inches were prepared from the pellets, and observed. "Warping" was scarcely seen in these discs.

The falling ball impact strengths shown in Table 4 were measured in accordance with a falling ball impact test set forth in JIS K6745-1976. A specimen, 50 mm in width, 150 mm in length and 2 mm in thickness, was prepared, and both ends of the specimen were fixed to a tester. One kilogram of a steel ball was let fall from a height of 10 to 70 cm above the specimen, and the breaking of the specimen was observed. The results were rated on the following scale. The ball falling test was performed on 10 specimens for each fixed height.

◎: none of the ten specimens were broken
○: one to two specimens out of ten were broken
Δ: 3 to 7 specimens out of ten were broken
X: 8 or more specimens out of ten were broken

TABLE 4

| Example | Amount of glass flakes (aspect ratio, 20–50) (parts) | Inorganic solid (parts) | Rubbery elastomer of Referential Example (parts) | Impact strength Height (cm) | Rating | Strength (kg · cm/cm) | Heat distortion temperature (°C.) | Ratio of percent molding shrinkages |
|---|---|---|---|---|---|---|---|---|
| 9 | 35 | Minex 7 (35) | 4.5 | 50 45 | ○ ◎ | 5.1 | 115.0 | 1.02 |
| 10 | 35 | Minex 7 (35) | 9 | 70 | ◎ | 5.9 | 100.0 | 1.10 |
| 11 | 35 | Minex 7 (35) | 20 | 70 65 | ○ ◎ | 6.5 | 85.0 | 1.15 |

EXAMPLES 12 and 13

To 100 parts of PBT having an intrinsic viscosity $[\eta]$ of 0.91 were added the powdery feldspar (Minex-7, a trademark for a product of Indusmin Company) and a polytetramethylene terephthalate-type block copolymer (HYTREL 4055, a trademark for a product of Du Pont) as the rubbery elastomer. The mixture was melt-kneaded and extruded by an extruder having a screw diameter of 50 mm at a cylinder temperature of 240° C. to form chips. The chips were molded by a 1-ounce injection molding machine under the following conditions.

Cylinder temperature: 240° C.
Molding cycle: primary pressure (hydraulic pressure 80 kg/cm$^2$) 2 seconds, secondary pressure (hydraulic pressure, 50 kg/cm$^2$) 8 seconds; cooling time 25 seconds.
Mold temperature: 60° C.

The impact strengths (ASTM D256, thickness ¼ inch, both notched and unnotched) of the molded articles were measured.

Furthermore, flat plates, 9.90 cm in length, 10.35 cm in width and 0.2 cm in thickness, were molded from the chips by using a 3.5-ounce in-line screw type extruder made by Nikko Anker, and the percent molding shrinkages of the flat plates were measured.

The results are shown in Table 5.

TABLE 5

| | Properties of molded articles | | | | | | |
|---|---|---|---|---|---|---|---|
| | Amount (% by weight) | | Impact strength (ASTM D256, kg · cm/cm) | | Heat distortion temperature (°C.) | Percent molding shrinkage (%) | | Ratio of percent molding shrinkages |
| Example | Powdery feldspar | Rubbery elastomer | Notched | Unnotched | | Longitudinal | Transverse | |
| 12 | 30 | 5 | 5.5 | 81.5 | 98.0 | 1.20 | 1.50 | 1.25 |
| 13 | 30 | 10 | 6.3 | 93.2 | 95.0 | 1.20 | 1.50 | 1.25 |

It is seen from Table 5 that the molded articles from the polyester compositions of this invention have markedly increased impact strengths.

EXAMPLES 14 and 15

To 100 parts of PBT having an intrinsic viscosity [η] of 0.91 were added the powdery feldspar (Minex-7, a trademark), flat glass flakes (Glass Flake CF 48, a trademark for a product of Nippon Glass Fibers K.K.) and the same rubbery elastomer as used in Examples 12 and 13 in the amounts indicated in Table 6. Each of the mixtures was melt-kneaded, and extruded by an extruder having a screw diameter of 50 mm at a cylinder temperature of 240° C. to form chips.

The chips were molded by a 1-ounce injection molding machine under the following conditions.
 Cylinder temperature: 240° C.
 Molding cycle: primary pressure (hydraulic pressure, 80 kg/cm$^2$) 2 seconds; secondary pressure (hydraulic pressure, 50 kg/cm$^2$) 8 seconds; and cooling time 25 seconds.
 Mold temperature: 60° C.

The impact strengths and heat distortion temperatures of the molded articles were measured.

Flat plates, 9.90 cm in length, 10.35 cm in width and 0.20 cm in thickness, were prepared by a 3.5-ounce inline screw type injection molding machine made by Nikko Anker. The percent molding shrinkages of the flat plates were measured.

The results are shown in Table 6.

TABLE 6

| | Amounts added (parts) | | | Properties of molded articles | | | | | |
| | | | | Impact strength (ASTM D250, kg · cm/cm) | | Percent molding shrinkage (%) | | Ratio of percent molding shrinkages | Heat distortion temperature (°C.) |
| Example | Powdery feldspar | Rubbery elastomer | Glass flakes | Nothced | Unnotched | Longitudinal | Transverse | | |
| --- | --- | --- | --- | --- | --- | --- | --- | --- | --- |
| 14 | 20 | 5 | 10 | 5.3 | 75.0 | 1.43 | 1.62 | 1.13 | 107 |
| 15 | 20 | 10 | 10 | 5.4 | 77.9 | 1.23 | 1.49 | 1.21 | 94 |

The results shown in Table 6 demonstrate that the polyester compositions of this invention give molded articles which have high impact strengths and heat distortion temperatures, and reduced warpage.

What we claim is:

1. A composition consisting essentially of 100 parts by weight of an aromatic polyester, 5 to 150 parts by weight of powdery feldspar up to a half of which may be replaced by another pulverulent inorganic filler, and 5 to 120 parts by weight of glass flakes.

2. The composition of claim 1 wherein the other pulverulent inorganic filler is talc powder.

3. A composition consisting essentially of 100 parts by weight of an aromatic polyester, 5 to 150 parts by weight of powdery feldspar up to a half of which may be replaced by another pulverulent inorganic filler, 5 to 120 parts by weight of glass flakes filler, and 1 to 100 parts by weight of a rubbery elastomer.

4. The composition of claim 3 wherein the other pulverulent inorganic filler is talc powder.

5. The composition of claim 3 wherein the rubbery elastomer is an elastomer obtained by copolymerizing a vinyl monomer with an acrylic polymer containing at least 70% of an acrylic ester recurring unit with the alkyl group containing 1 to 13 carbon atoms, the content of the acrylic ester unit being 30 to 90% based on the elastomer.

6. The composition of claim 3 wherein the other pulverulent inorganic filler is talc powder, and the rubbery elastomer is a poly(ether.ester)elastomer.

* * * * *